W. A. GREENLAW.
FLEXIBLE PIPE JOINT.
APPLICATION FILED APR. 20, 1908.
918,443.
Patented Apr. 13, 1909.
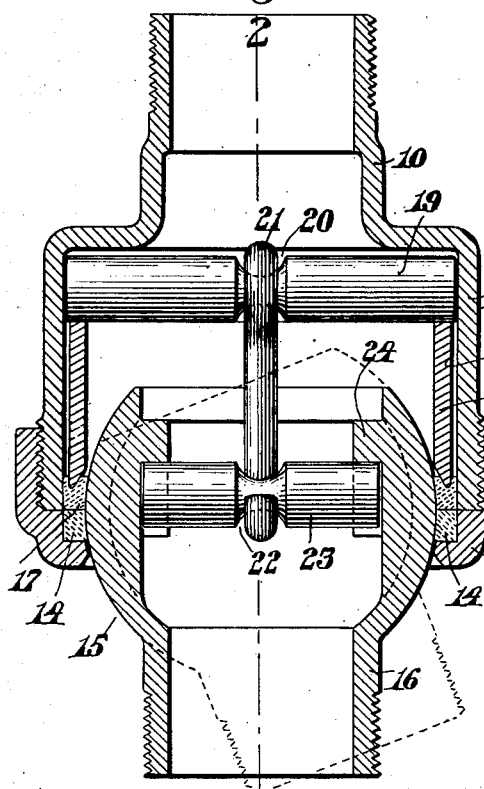
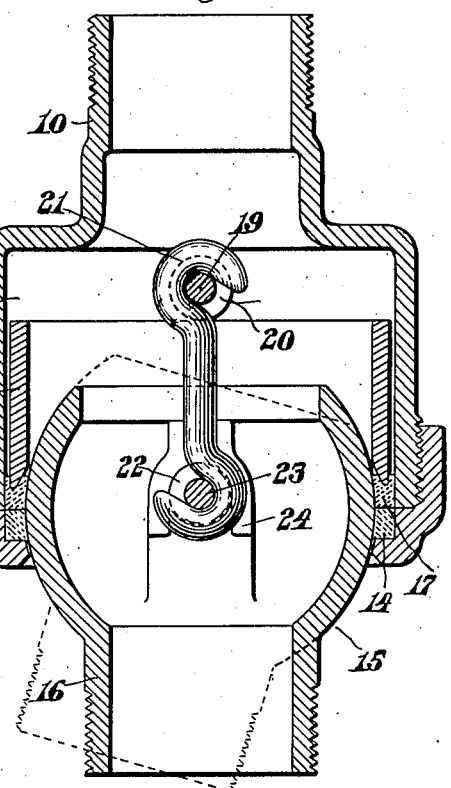
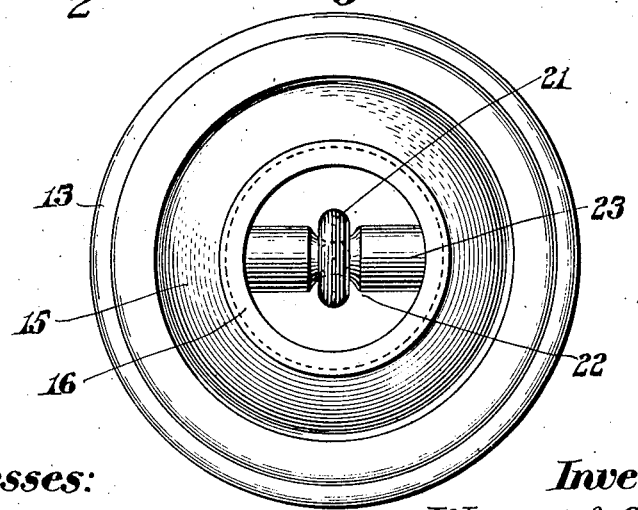
Witnesses:
Howard Hanscom
Nathan C. Lombard
Inventor:
Warren A. Greenlaw,
by Walter E. Lombard,
Atty.

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

FLEXIBLE PIPE-JOINT.

No. 918,443.  Specification of Letters Patent.  Patented April 13, 1909.

Application filed April 20, 1908. Serial No. 428,288.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Flexible Pipe-Joints, of which the following is a specification.

This invention relates to flexible pipe joints and has for its object the production of a joint in which the pipe member is provided with a ball end adapted to be positioned by an articulated device within an enlarged chamber in the other pipe member, means being provided whereby any tendency of said ball end to move outwardly will cause the packing interposed between the outer face thereof and the inner wall of the chamber, to be forced against the faces thereof to more effectually pack the joint under such abnormal conditions.

The invention consists in certain novel features of construction and arrangement of parts which will be readily understood by reference to the description of the drawings and to the claims hereinafter given.

Of the drawings: Figure 1 represents a section of a pipe joint embodying the features of this invention. Fig. 2 represents a similar section through the same, the cutting plane being on line 2—2 on Fig. 1, and Fig. 3 represents an inverted plan of the same.

Similar characters designate like parts throughout the several figures of the drawings.

In the drawings, 10 represents a pipe member having at one end an enlargement 11 containing a chamber 12 considerably larger than the ball of the main portion of the pipe member 10. The end of the enlargement 11 has threaded thereto a cap 13 carrying therewith a packing ring 14 providing a seat for a ball end 15 of the second pipe member 16. Superimposed upon the packing ring 14 is a packing ring 17 interposed between the outer face of the ball 15 and the inner wall of the chamber 12. Superimposed upon this ring 17 is a bevel edged ring 18 the beveled edges of which are adapted to enter the packing ring 17 and when forced downwardly therein to separate the same and cause the edges thereof to be forced against the wall of the chamber 12 and the outer face of the ball 15 to more effectually pack the joint between the same.

A member 19 extends transversely across the chamber 12 and rests upon the upper end of the ring 18, this member having an annular groove 20 midway of its length in which is situated one end of a connector 21 the opposite end of which is seated in a peripheral concaved groove 22 in a cylindrical member 23 extending across the interior of the ball end 15 with its ends resting in seats 24 formed upon the inner wall of said ball end 15. The bottom of the groove 22 which forms a seat for the lower end of the connector 21 is in the center of the ball 15 so that the pipe members 16 may be moved about said cylinder in any direction to permit the two pipe members to assume positions at various angles relative to one another, the members 19, 21, and 23 being articulated in such a manner as to freely permit this movement.

It is obvious that as constructed any tendency of the ball to move outwardly from the chamber 12 will cause the transverse member 19 to force the bevel edged ring 18 farther into the packing ring 17 and cause the latter to impinge more firmly upon the wall of the chamber 12 and the outer face of the ball 15 and thus more effectually pack the joints to prevent leakage from the chamber 12.

It is believed that the operation and many advantages of a pipe joint such as is herein described will be fully understood without further description.

Having thus described my invention, I claim:

1. In a flexible pipe joint, the combination of a pipe member having an enlarged chamber at one end; a second pipe member having a ball end positioned in said chamber; a cap secured to the first-named pipe member for retaining said ball; a packing between said ball and the wall of said chamber; an articulated connector having a seat within the confines of said ball and extending beyond the inner end thereof; and means interposed between said connector and said packing adapted to cause the packing to impinge upon said ball whenever said ball is moved outwardly from said chamber.

2. In a flexible pipe joint, the combination of a pipe member having an enlarged chamber at one end; a second pipe member having a ball end positioned in said chamber; a cap secured to the first-named pipe member for retaining said ball; a packing between said ball and the wall of said chamber; an articulated connector having a seat within the confines of said ball and extending beyond the inner end thereof; and a bevel edged ring interposed between said connector and said packing adapted to cause the packing to impinge upon said ball whenever said ball is moved outwardly from said chamber.

3. In a flexible pipe joint, the combination of a pipe member having an enlarged chamber at one end; a second pipe member having a ball end positioned in said chamber; a cap secured to the first-named pipe member provided with a packing ring for retaining said ball; a packing between said ball and the wall of said chamber; an articulated connector having a seat within the confines of said ball and extending beyond the inner end thereof; and a bevel edged ring interposed between said connector and said packing adapted to cause the packing to impinge upon said ball whenever said ball is moved outwardly from said chamber.

4. In a flexible pipe joint, the combination of a pipe member having an enlarged chamber at one end; a second pipe member having a ball end positioned in said chamber; a cap secured to the first-named pipe member for retaining said ball; a packing between said ball and the wall of said chamber; a member extending across the interior of said ball end and seated therein; a transverse member within said chamber; a connector between said members; and a bevel edged ring interposed between said transverse member and said packing.

5. In a flexible pipe joint, the combination of a pipe member having an enlarged chamber at one end; a second pipe member having a ball end positioned in said chamber; a cap secured to the first-named pipe member for retaining said ball; a packing between said ball and the wall of said chamber; a member extending across the interior of said ball end and seated therein having a central peripheral groove; a transverse member within said chamber seated in said groove; and a bevel edged ring interposed between said transverse member and said packing.

6. In a flexible pipe joint, the combination of a pipe member having an enlarged chamber at one end; a second pipe member having a ball end positioned in said chamber; a cap secured to the first-named pipe member; and articulated means within said chamber and retained therein by said cap for retaining said ball within said chamber.

7. In a flexible pipe joint, the combination of a pipe member having an enlarged chamber at one end; a second pipe member having a ball end positioned in said chamber; a cap secured to the first-named pipe member; a transverse member within said chamber; a cylindrical member with a central concave groove seated in said ball end; and a connector between said members and seated in said groove.

8. In a flexible pipe joint, the combination of a pipe member having an enlarged chamber at one end; a second pipe member having a ball end positioned in said chamber; a cap secured to the first-named pipe member; a transverse member within said chamber; a cylindrical member with a central concave groove seated in said ball end; and a connector between said members and seated in said groove the contact between said connector and the bottom of said groove being at the center of said ball end.

Signed by me at 7 Water st., Boston, Mass., this 15th day of April, 1908.

WARREN A. GREENLAW.

Witnesses:
 WALTER E. LOMBARD,
 NATHAN C. LOMBARD.